United States Patent [19]
Fortain et al.

[11] Patent Number: 6,025,570
[45] Date of Patent: Feb. 15, 2000

[54] VARIABLE-POLARITY PLASMA ARC WELDING PROCESS AND DEVICE

[75] Inventors: Jean-Marie Fortain, Osny; Eric Verna, Boissy L'Aillerie; Christian Reymond, Montmagny, all of France

[73] Assignee: La Soudure Autogene Francaise, Paris Cedex, France

[21] Appl. No.: 09/205,698

[22] Filed: Dec. 4, 1998

[30] Foreign Application Priority Data

Dec. 11, 1997 [FR] France .................................. 97 15703

[51] Int. Cl.[7] .................................................. B23K 10/00
[52] U.S. Cl. ............................... 219/121.46; 219/121.45; 219/121.54; 219/121.57
[58] Field of Search ......................... 219/130.32, 121.45, 219/121.46, 121.54, 121.57, 121.59, 75

[56] References Cited

U.S. PATENT DOCUMENTS

| | | | |
|---|---|---|---|
| 4,555,612 | 11/1985 | Collins et al. | 219/130.32 |
| 5,045,667 | 9/1991 | Iceland et al. | 219/121.54 |
| 5,466,905 | 11/1995 | Flowers et al. | 219/121.46 |

*Primary Examiner*—Mark Paschall
*Attorney, Agent, or Firm*—Young & Thompson

[57] ABSTRACT

The invention relates to a plasma arc welding process and a plasma arc welding device for aluminum and its alloys, which process comprises at least one step of initiation of a pilot arc by means of an auxiliary current which is delivered by an auxiliary current source and flows in a pilot-arc circuit, one step of feeding with plasma gas, one step of initiation of a main arc by means of a main current which is delivered by a main current source and flows in a main circuit, one step of cyclic variation of the polarity of the main current so as to obtain at least one phase of descaling the material to be welded with a first current polarity and at least one phase of welding the material with a second current polarity, and in which process the supply of auxiliary current to the pilot-arc circuit is stopped during the descaling phase and the main circuit and to the pilot-arc circuit are supplied with main current.

8 Claims, 1 Drawing Sheet

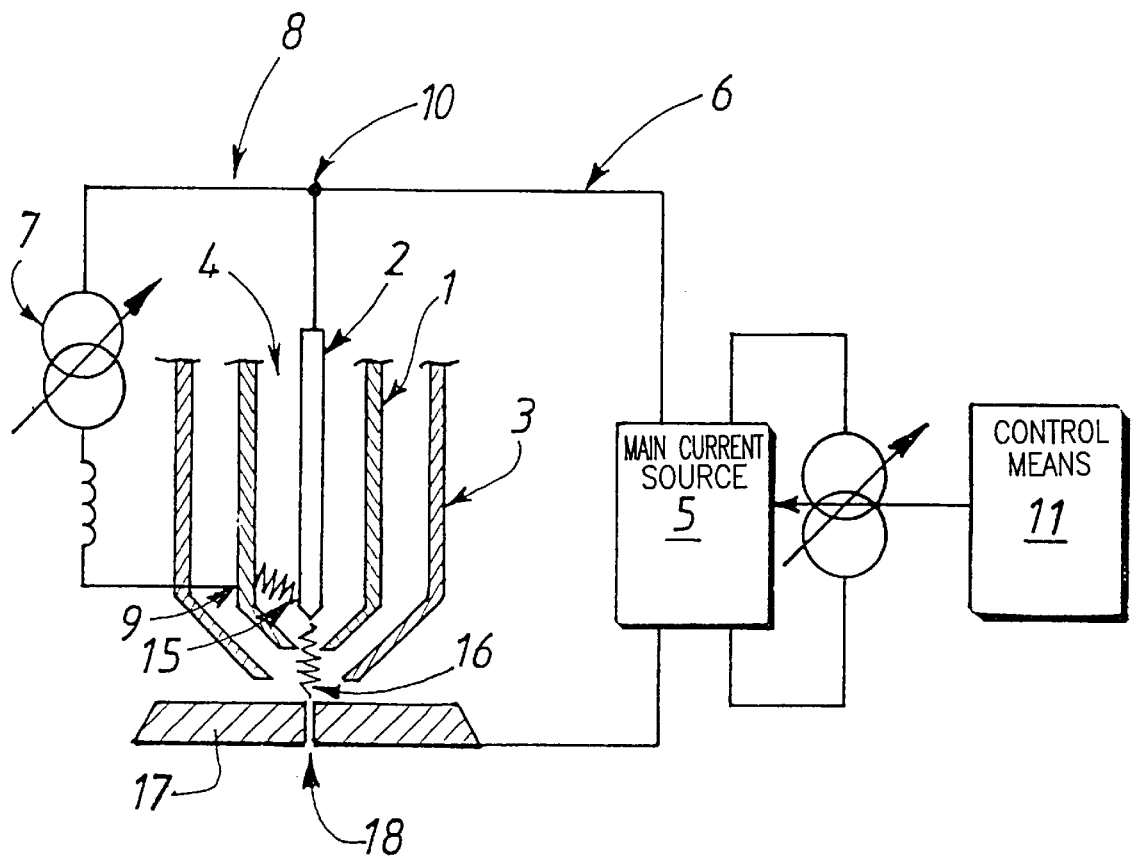

VARIABLE-POLARITY PLASMA ARC WELDING PROCESS AND DEVICE

FIELD OF THE INVENTION

The invention relates to a plasma arc welding process for aluminum and aluminum alloys.

BACKGROUND OF THE INVENTION

Plasma arc welding or plasma welding is, as taught by the document "Plasma Arc Welding", Chap. 10, pages 330–350, 8th edition 1991, incorporated here by way of reference, a metal fusion welding process which involves heating the metal by means of an electric arc which forms between a non-consumable electrode and the metal workpiece or workpieces to be welded (transferred arc) or, depending on the case, between the electrode and the nozzle of the plasma torch (non-transferred arc).

An ionized gas flow delivered by the plasma torch serves, on the one hand, as a gas shield and, on the other hand, to transfer the heat generated by the electric arc to the workpiece to be welded and, optionally, to channel the electric arc between the non-consumable electrode and the workpiece to be welded.

An inert gas, such as argon or a mixture comprising such a gas, for example an argon/helium mixture, may be employed as the plasma gas. Usually, plasma arc welding processes are used to weld "carbon" steels or stainless steels in a single pass, that is to say in a single run, and without any special preparation beforehand of the steel workpieces to be welded, this being the case for thicknesses ranging up to 10 mm.

Thus, in "keyhole" welding mode, especially by dint of a high energy density and of constriction of the arc, a hole is formed in line with the weld joint and the flow of plasma gas penetrates reliably through the entire thickness of the material.

Moreover, aluminum and aluminum alloys are conventionally welded by inert-gas-shielded arc welding processes, such as the TIG (Tungsten Inert Gas) or MIG (Metal Inert Gas) type processes rather than by using plasma arc type processes.

However, there has for some time now been a strong demand from industry, particularly from the aeronautical and aerospace industries, for plasma arc welding processes allowing aluminum and aluminum alloys to be effectively welded, in particular using automatic welding.

Thus, plasma arc welding in "keyhole" mode, which was firstly used widely for welding carbon and stainless steels, has been extended to the welding of aluminum and aluminum alloys.

The document "Plasma Arc Welding of Aluminum Gas Containers", by H. Fostervoll et al., pages 367–375, incorporated here by way of reference, describes a process for the plasma arc welding in "keyhole" mode of two aluminum hemispheres or half-containers so as, after joining and welding them together, to form a gas container 352 mm in diameter, the aluminum walls of which have a thickness of 8 mm. This process uses a variable-polarity welding set of the HOBART™ VP-300-S type, a welding control system of the ISOTEK™ type and 99.99% pure argon as the plasma gas.

Furthermore, the document "Variable Polarity Plasma Arc Welding on the Space Shuttle External Tank", by A. C. Numes et al., Welding Journal, September 1984, pages 27–35, describes a variable-polarity plasma arc welding process used for NASA in order to produce the external tanks of the American space shuttle. This document particularly stresses the low cost of the plasma arc process, compared with conventional TIG or MIG processes, when welding aluminum, given that this process especially saves having to pretreat the workpieces to be welded.

This is because, unlike steel, aluminum and its alloys require, before welding, a prior preparation or pretreatment in order to remove therefrom the oxides and other contaminants (dust, grease, etc.) that are likely to cover them. Usually, this pretreatment is carried out by chemical pickling or mechanical descaling, such as brushing, of the said aluminum workpieces, which correspondingly increases the production costs.

However, it has been observed that by varying, over time, the polarity of the current used during the arc plasma welding it was possible to effect a kind of descaling of the surface of the material by the plasma flow, prior to the actual welding of the material.

More specifically, variable polarity is a form of alternating current having an asymmetric, rectangular waveform which can be controlled in terms of period and in terms of amplitude.

Usually, the current is varied cyclically from a background current (Id) or descaling-phase current, maintained for a descaling time (Td), to a peak current (Iw) or welding-phase current, maintained for a welding time (Tw).

In general, a descaling time (Td) of duration less than the welding time (Tw) is chosen, but with a greater amplitude of the current during the descaling phase than that during the welding phase.

This is because it has been found that the lifetime of the tungsten electrode depends on the Tw/Td ratio.

Furthermore, the set-back of the electrode in the nozzle of the welding torch, the torch height with respect to the workpiece or material to be welded, and the plasma gas flow rate play a not insignificant role in the dynamics of the flow.

Thus, in keyhole-mode welding, it is necessary to control, that is to say limit, the flow rate of the plasma gas in order to prevent any adventitious cutting of the workpiece. This may especially be accomplished by choosing an electrode diameter as small as possible so as not to cause too rapid a gas flow.

On the other hand, a large set-back distance of the electrode in the nozzle and/or a higher current signal frequency make it possible to increase the stiffness of the plasma column and therefore to decrease the supply of electrical energy.

Variable-polarity welding also has the advantage of resulting in low porosity in the weld bead.

SUMMARY OF THE INVENTION

The object of the present invention is to improve the variable-polarity plasma arc welding processes for aluminum and its alloys by providing a process and a device:

not having the drawbacks of the conventional processes, making it possible to obtain better welding stability for very thick workpieces, i.e. for workpieces having a thickness of 8 mm and higher, for example, allowing such workpieces to be welded effectively, without workpiece preparation, that is to say by means of a square butt joint, and being easy to implement on an industrial scale.

The present invention therefore relates to a plasma arc welding process for aluminum and aluminum alloys, comprising at least:

one step of initiation of a pilot arc between an electrode and a welding nozzle by means of an auxiliary current which is delivered by at least one auxiliary current source and flows in a pilot-arc circuit;

one step of feeding the welding nozzle with plasma gas;

one step of initiation of a main arc between the electrode and a material to be welded by means of a main current which is delivered by at least one main current source and flows in a main circuit;

one step of cyclic variation of the polarity of the main current so as to obtain at least one phase of descaling the material with a first current polarity and at least one phase of welding the material with a second current polarity, and in which process the supply of auxiliary current to the pilot-arc circuit is stopped for at least part of the descaling phase and the main circuit and the pilot-arc circuit are supplied with the main current.

Depending on the case, the process of the invention comprises one or more of the following characteristics:

the supply of the main current to the pilot-arc circuit is maintained throughout the descaling phase;

while the main current is being supplied to the pilot-arc circuit, the main current is left to be distributed naturally in the pilot-arc circuit and in the main circuit on the basis of the equivalent impedances of these circuits;

while the main current is being supplied to the pilot-arc circuit, the main current source and the auxiliary current source operate in a manner equivalent to a series operation;

while the main current is being supplied to the pilot-arc circuit, the main current source delivers a main current of at least 100 A, preferably of 150 to 300 A;

the duration of the descaling phase is preferably less than the duration of the welding phase.

The invention furthermore relates to a device capable of implementing a process according to the invention, and more particularly a plasma arc welding device comprising:

a plasma torch having a welding nozzle assembly provided with a nozzle and an electrode, preferably a concentric nozzle for annular shielding;

means for feeding the torch with a plasma gas;

at least one programmable, controllable or pilot-controllable, variable-polarity main current source;

a main current circuit;

at least one auxiliary current source;

a pilot-arc circuit;

means for initiating a pilot-arc between the electrode and the nozzle;

means for switching from a pilot arc to a main arc;

control means allowing the polarity of the main current to be varied cyclically between a first current polarity corresponding to a descaling-phase polarity and at least one second current polarity corresponding to a welding-phase polarity; and control means allowing the supply of auxiliary current to the pilot-arc circuit to be stopped and allowing the main circuit and the pilot-arc circuit to be supplied with the main current during at least part of the descaling phase.

The invention also relates to the use of such a device in an operation of welding a workpiece, that is to say a component, element, structure or the like, comprising at least one part made of aluminum or of an aluminum alloy, as well as to a component for the chemical, petrochemical or nuclear industry or for rail, sea, air, road or space transportation, which includes at least one weld capable of being obtained by the process of the invention.

The invention will now be described in more detail with the aid of a diagram of one embodiment of a device according to the invention and of comparative tests made with such a device, these being given by way of illustration but being in no way limiting.

BRIEF DESCRIPTION OF THE INVENTION

The appended single FIGURE shows a diagram of a device for implementing the process of the invention and to check its effectiveness.

More specifically, the plasma arc welding device of the appended single figure comprises a plasma torch having a welding nozzle assembly provided with a nozzle 1 surrounding a tungsten electrode 2, the nozzle 1 itself being inserted into an outer nozzle 3 which provides annular shielding. Feed means 4 feed the torch with plasma gas.

The main current circuit 6 is supplied by a programmable variable-polarity main current source 5, which is controlled by control means 11, the control means 11 making it possible to vary the polarity of the main current cyclically, between a first current polarity corresponding to a descaling-phase polarity and at least one second current polarity corresponding to a welding-phase polarity. The main current source 5 delivers, for example, an alternating current of 320 A.

Likewise, a pilot-arc circuit 8 is supplied by an auxiliary current source 7.

Moreover, pilot-arc initiation means 9 make it possible to initiate a pilot arc 15 between the electrode 2 and the nozzle 1 and main-arc initiation means make it possible to initiate a main arc 16 between the said electrode 2 and the material 17 to be welded, so as to obtain a weld joint 18.

During all or part of the descaling phase, control means 10 ensure that the arc-pilot circuit 8 stops being supplied with auxiliary current and that the main circuit 6 and the pilot-arc circuit 8 are supplied with the main current.

In other words, during the descaling phases, the fact of maintaining the arc-pilot circuit 8 connected to the main circuit 6 causes a natural distribution of the main current between the two circuits on the basis of their own inductances.

In order to check the effectiveness of the process and of the device of the invention, several comparative tests (Tests 1 to 5) were carried out; the experimental parameters used during these tests are given in the following table.

TABLE

| Test No. | 1 | 2 | 3 | 4 | 5 |
|---|---|---|---|---|---|
| Descaling current (A) | 220 | 250 | 310 | 200 | 180 |
| Descaling time (msec) | 3.5 | 3.5 | 3.5 | 3.5 | 3.5 |
| Welding current (A) | 140 | 180 | 180 | 140 | 140 |
| Welding time (msec) | 8 | 8 | 8 | 8 | 8 |
| Arc length (mm) | 10 to 12 | 10 to 12 | 10 to 12 | 3 | 3 |
| Flow rate (l/min.) | 3 | 3 | 3 | 3.5 | 3 |
| Voltage (V) | 30 | 31 | 31 | 28 | 28 |
| Welding speed (cm/min.) | 24 | 22 | 22 | 25 | 25 |

TABLE-continued

| Test No. | 1 | 2 | 3 | 4 | 5 |
|---|---|---|---|---|---|
| Flow rate (l/min.) | 20 | 20 | 20 | 20 | 20 |
| Type of wire | NIC 30 | NIC 10 | NIC 30 | NIC 30 | NIC 30 |
| Wire diameter (mm) | 1.2 | 1.2 | 1.2 | 1.6 | 1.6 |
| Pay-out speed (m/min.) | 1.4 | 1.4 | 1.4 | 1.8 | 1.8 |
| Nozzle diameter (mm) | 3 | 3 | 3 | 3 | 3 |
| Plate thickness (mm) | 6 | 6 | 8 | 6 | 6 |
| Alloy type | AG4 | A5 | AG4 | AG4 | AG4 |
| Pilot arc operating during welding | no | no | no | no | no |
| Pilot arc operating during descaling | yes | yes | yes | no | no |

In Tests 1 to 5, the annular gas used is an argon/helium mixture, such as the gas INARC 6™, and the plasma gas used is argon, such as the gas ARCAL 1™; the INARC 6™ and ARCAL 1™ gases are sold by L'AIR LIQUIDE. Furthermore, the NIC10- and NIC30-type wires are sold by LA SOUDURE AUTOGENE FRANCAISE and correspond to aluminum alloys of the 1100 type and 5356 type, respectively.

The results obtained are as follows:

Test 1 (downhand or flat-position welding): it is observed that the surface of the weld bead is covered with a whitish film. However, weld penetration is uniform and there is no appearance of undesirable porosity after radiographic inspection;

Test 2 (downhand welding): welding an A5-type aluminum alloy requires a larger amount of energy to be supplied than that for an AG4-type alloy. However, the descaled zone is wide;

Test 3 (downhand welding): the welding regime is stable and the results are similar to those obtained in Test 1;

Tests 4 and 5 (horizontal-vertical position welding): given the collapse of the pool of molten metal in the horizontal-vertical position, it is preferable to use large wire diameters (1.6 mm) and a higher pay-out speed (1.4 to 1.8 m/min.). For the rest, the quality of the weld beads is substantially equivalent to that of Tests 1 and 3 (the same operating parameters) and the weld-toe and weld-root reinforcements and the joints are satisfactory. As regards the degree of porosity, this is also substantially equivalent to that in Tests 1 and 3.

As a result, for a given thickness of material, the process of the invention makes it possible to maintain a stable and effective plasma jet during descaling, that is to say avoiding any adventitious cutting of the material to be welded, and furthermore to give weld beads that have a slightly oxidized appearance and are free of porosity.

The process of the invention may be used especially for welding aluminum and aluminum alloys having a thickness of about 4 to 10 mm, or more.

We claim:

1. Plasma arc welding process for aluminum and aluminum alloys, which comprises:
   initiating a pilot arc between an electrode and a welding nozzle by supply of an auxiliary current which is delivered by at least one auxiliary current source and flows in a pilot-arc circuit;
   feeding the welding nozzle with plasma gas;
   initiating a main arc between the electrode and a material to be welded by supply of a main current which is delivered by at least one main current source and flows in a main circuit;
   cyclically varying the polarity of the main current so as to obtain at least one phase of descaling the material with a first current polarity and at least one phase of welding the material with a second current polarity; and
   stopping the supply of auxiliary current to the pilot-arc circuit for at least part of the descaling phase, and supplying the main circuit and the pilot-arc circuit with the main current.

2. Process according to claim 1, wherein the supply of the main current to the pilot-arc circuit is maintained throughout the descaling phase.

3. Process according to claim 1, wherein while the main current is being supplied to the pilot-arc circuit, the main current is left to be distributed naturally in the pilot-arc circuit and in the main circuit on the basis of the equivalent impedances of these circuits.

4. Process according to claim 1, wherein while the main current is being supplied to the pilot-arc circuit, the main current source and the auxiliary current source operate in a manner equivalent to a series operation.

5. Process according to claim 1, wherein while the main current is being supplied to the pilot-arc circuit, the main current source delivers a main current of at least 100 A.

6. Process according to claim 5, wherein while the main current is being supplied to the pilot-arc circuit, the main current source delivers a main current ranging from 150 to 300 A.

7. Process according to claim 1, wherein the duration of the descaling phase is less than the duration of the welding phase.

8. Plasma arc welding device comprising:
   a plasma torch having a welding nozzle provided with an electrode;
   means for feeding the torch with a plasma gas;
   at least one programmable variable-polarity main current source;
   a main current circuit;
   at least one auxiliary current source;
   a pilot-arc circuit;
   means for initiating a pilot arc between the electrode and the nozzle;
   means for switching from a pilot arc to a main arc;
   control means allowing the polarity of the main current to be varied cyclically between a first current polarity corresponding to a descaling-phase polarity and at least one second current polarity corresponding to a welding-phase polarity; and
   control means allowing the supply of auxiliary current to the pilot-arc circuit to be stopped and allowing the main circuit and the pilot-arc circuit to be supplied with the main current during at least part of the descaling phase.

* * * * *